United States Patent

[11] 3,602,259

| [72] | Inventor | George J. Martin |
| | | Lyndhurst, Ohio |
| [21] | Appl. No. | 13,683 |
| [22] | Filed | Feb. 24, 1970 |
| [45] | Patented | Aug. 31, 1971 |
| [73] | Assignee | Parker-Hannifin Corporation |
| | | Cleveland, Ohio |

[54] DIRECTIONAL CONTROL VALVE
5 Claims, 1 Drawing Fig.

[52] U.S. Cl. .......................................... 137/596.12,
137/608, 137/625.68
[51] Int. Cl. .......................................... F16k 11/07,
F16k 11/10
[50] Field of Search .......................................... 137/271,
596, 596.12, 596.13, 596.2, 608, 625.68

[56] References Cited
UNITED STATES PATENTS

| 2,651,324 | 9/1953 | Hodgson et al. | 137/625.68 X |
| 3,012,576 | 12/1961 | Williams | 137/596.13 |
| 3,160,174 | 12/1964 | Schmiel et al. | 137/596.12 X |
| 3,195,559 | 7/1965 | Stacy | 137/596.13 X |
| 3,457,951 | 7/1969 | Williams | 137/596 |
| 3,482,600 | 12/1969 | Hodgson | 137/625.68 X |

*Primary Examiner*—Henry T. Klinksiek
*Attorney*—Oberlin, Maky, Donnelly and Renner ABSTRACT: A series circuit spool valve assembly characterized in that the upstream valve spool bore has tubular members closing the normal return passages which are adjacent the respective motor passages and in that the upstream valve spool is hollow with passages therein which communicate a return flow motor passage with a portion of the bypass passage which is between the upstream and downstream valve spool bores whereby, upon operation of the downstream valve spool, the fluid displaced from the upstream motor is employed to actuate the downstream motor thus to secure series operation. The invention is further characterized in that the valve housing has the same coring as is employed for a parallel circuit wherein any one or more or all spools may be operated to control the respective fluid motors and for a series parallel circuit wherein only one spool at a time may be operated to control its respective fluid motor.

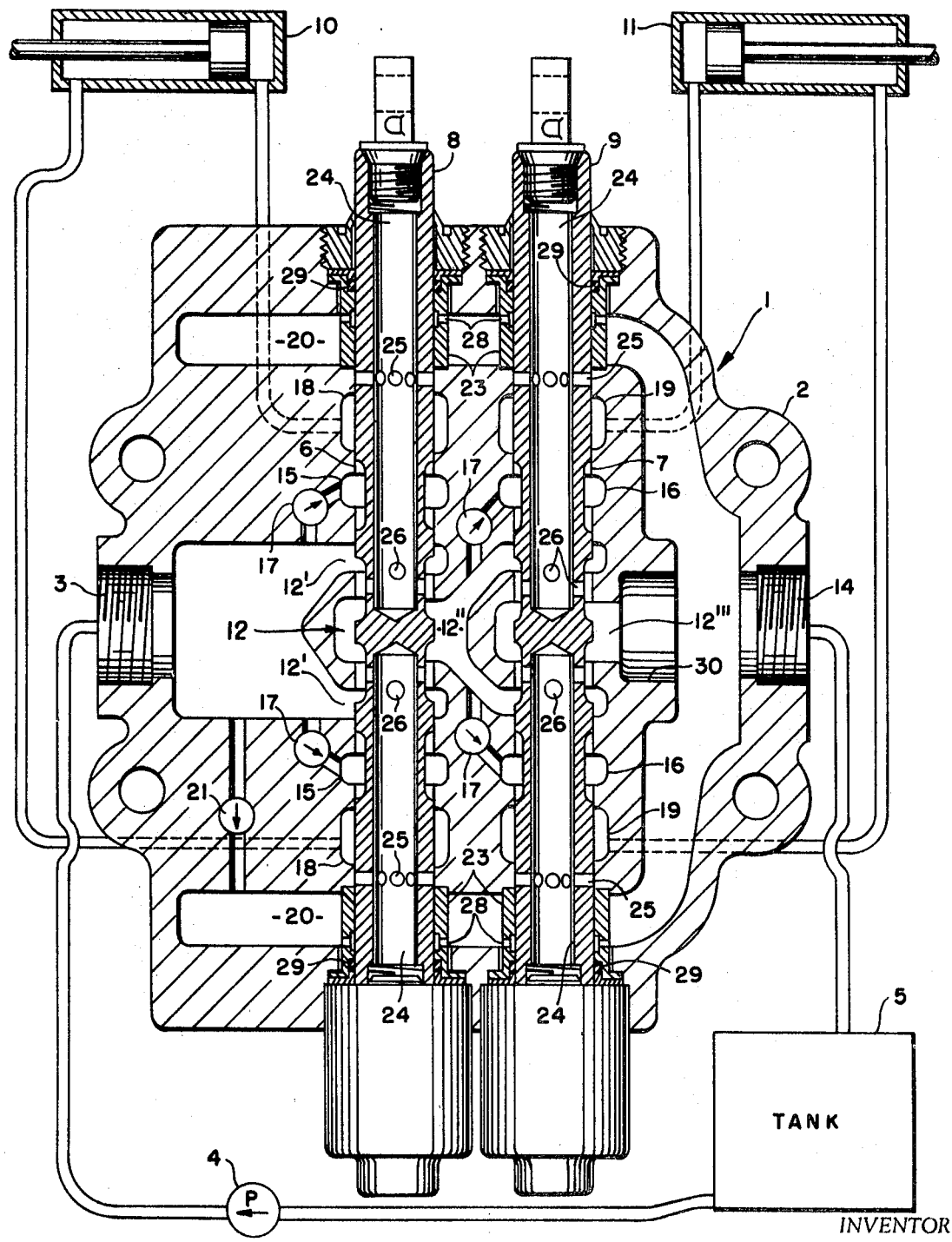

DIRECTIONAL CONTROL VALVE

BACKGROUND OF THE INVENTION

It is known for example from the George J. Martin U.S. Pat. No. 3,409,041, granted Nov. 5, 1968, to employ a conventional valve housing for parallel or series-parallel circuits for use in a series circuit arrangement by employing a hollow upstream valve spool which has in the opposite ends thereof body members which provide valve seats for a pair of spring-biased check valves which direct return flow from the upstream motor to the portion of the bypass which is between the upstream and downstream spool bore so that the return fluid from the upstream motor may be conducted to the downstream motor upon operation of the downstream spool, the check valves being operative to prevent pressure flow from the motor passages to the adjacent return passages.

SUMMARY OF THE INVENTION

Contrary to the foregoing, in the present case the upstream spool bore has therein tubular sealing members which span the respective return passages, and the upstream spool merely has passages therein (without spring-biased check valve members and check valve bodies) to provide for free return flow from the upstream motor to the portion of the bypass which is between the upstream and downstream spool bores whereby such return flow may pass through the bypass passage of the downstream spool to the tank when the downstream spool is in neutral position or may pass to a motor passage of the downstream spool bore when the downstream spool is in an operating position. Accordingly, herein large size passages without check valves may be employed in the upstream spool which provides an inexpensive construction and which avoids the higher pressure drop due to smaller passages and the spring-biased check valves as aforesaid.

Other objects and advantages of the present invention will appear hereinafter.

BRIEF DESCRIPTION OF THE DRAWING

The single FIGURE is a cross section view through a spool valve assembly embodying the present invention to provide a series circuit in connection with a pair of fluid motors wherein either motor may be operated independently of the other by actuation of the respective spool but when both spools are in an operating position the return fluid from the upstream motor is employed to actuate the downstream motor.

DETAILED DESCRIPTION OF THE INVENTION

In the illustrated embodiment of the invention the two spool valve assembly 1 comprises a conventional cast housing 2 having an inlet port 3 adapted to be communicated with the discharge port of a pump 4 which has its intake port connected with a tank 5.

The housing 2 has parallel bores 6;7 therethrough in which the respective spools 8;9 are reciprocable to control flow of fluid to and from the respective double acting fluid motors 10;11. The bores 6;7 are intersected starting at the middle by a bypass passage 12 which communicates with the inlet port 3 upstream of spool bore 6, with both bores 6 and 7 therebetween, and with return port 14 downstream of the spool bore 7. Straddling the bypass passage 12 are the respective pressure feed passages 15;15 and 16;16 which by way of check valves 17 lead to the upstream portion 12 bypass passage 12 upstream of spool bore 6 and to the portion 12 of bypass passage 12 between spool bores 6 and 7. Straddling the pressure feed passages 15;15 and 16;16 are motor passages 18;18 and 19;19 which are connected as shown with the double acting fluid motors 10 and 11. Finally, straddling the motor passages are return passages 20;20 which communicate with the return port 14. Between the upstream portion 12 of the bypass passage 12 and the lower return passage 20 is a conventional relief valve 21.

As evident, the valve housing 2 as just described is of conventional form and by employing conventional four-way valve spools, the valve assembly is of the series-parallel type when the check valve 17 inlets for the downstream spool bore 7 are communicated with the in-between portion 12 of the bypass passage 12, and if parallel circuit operation is desired, the inlets for these check valves 17 are communicated with the upstream portion 12 of the bypass passage 12, whereby either or both conventional spools may be operated as desired.

To convert the housing 2 for series circuit operation according to the present invention, sleeve members 23 are installed in opposite ends of the upstream spool bore 6 slidably receiving the upstream spool 8 to close off communication of the return passages 20 with the adjacent motor passages 18;18. The only other change is that at least the upstream spool 8 is hollow, the same being provided with longitudinal bores 24 extending toward the middle from opposite ends intersected by axially spaced passages 25 and 26 which as now to be explained conduct return flow from the upstream motor 10 to the portion of the bypass passage 12 between bores 6 and 7 so that if it is desired to simultaneously operate the downstream spool 9, this return flow is conducted into the upper or lower pressure feed passage 16 of said downstream spool 9.

When the spools 8 and 9 are in the position shown in the drawing fluid discharged by the pump 4 flows through the bypass passage 12 to the return port 14 and thence into the tank 5 and the motor passages 18;18 and 19;19 are blocked so that the pistons in the motors 10 and 11 are held against movement in either direction.

When the upstream spool 8 is shifted upwardly, the bypass passage 12 is closed and communication is opened between the upper feed passage 15 and the upper motor passage 18 while the spool passages 25 enter the upper sleeve 23 and are closed thereby, whereby the piston in motor 10 is shifted to the left and the return flow from the motor 10 enters the lower motor passage 18 and flows through the passages 25, 24, and 26 to the portion 12 of bypass passage 12 between bores 6 and 7, and thence to the return port 14 if the downstream spool 9 is in neutral position as shown.

When the upstream spool is shifted downwardly from neutral position, the lower pressure feed passage 15 is communicated with the lower motor passage 18 thus to move the piston in motor 10 to the right, and return flow from the motor 10 flows through the upper motor passage 18, the spool passages 25, 24, and 26 into the portion 12 of bypass passage 12 between bores 6 and 7. It is to be noted that the tubular members 23 have passages 28 through the wall thereof so that in the event of leakage of high pressure fluid over the outside diameter of the spools 8, 9 such pressure does not build up on the packing rings 29, since the return passages 20 are at low pressure and are communicated with the return port 14.

If only two fluid motors are to be actuated independently or in series, the downstream spool 9 may be of conventional solid four-way type and the tubular members 23 at the upper and lower ends thereof may be omitted entirely, whereby return flow from the downstream motor 11 will be conducted from either motor passage 19 into the adjacent return passage 20 through the conventional peripheral grooves in such solid spool. See, for example, the aforesaid Martin U.S. Pat. No. 3,409,041 in which the downstream spool is of conventional solid form. However, if another spool valve assembly (not shown) is disposed downstream for actuating another pair of motors, the downstream spool 9 may be of the same construction as the upstream spool 8 as shown herein with tubular members 23 blocking the return passages 20. In that case, a tubular carryover fitting (not shown) will be installed in the return port 14 to make sealed engagement with the bypass passage bore 30 and thus fluid passing through the bypass passage 12 may be conducted to operate the valve spools of another valve assembly which is disposed downstream of the valve assembly 1 herein shown. The arrangement just described i.e., one employing a tubular carryover fitting is disclosed in the Olsavsky U.S. Pat. No. 3,195,571 wherein the bypass passage of an upstream valve assembly is communicated with the pressure inlet port of a downstream valve assembly. Of course, where such carryover fitting is employed, the return passages 20 of the upstream valve spools 8 and 9 will be communicated with the tank 5 through a separate return port (not shown).

Now, when both spools 8 and 9 are shifted to operating position the bypass passage 12 of the downstream spool 9 is closed whereby the return fluid from the upstream motor 10 conducted into the in-between portion 12 of the bypass passage 12 flows through either check valve 17 to communicate one set of adjacent pressure feed and motor passages 16 and 19 while the other motor passage 19 which is connected to the return side of the downstream motor 11 to conduct fluid through the spool passages 25, 24 and 26 into the downstream portion 12 of the bypass passage 12 and thence into the tank 5 or in the case of the use of a tubular carryover fitting, to the next valve assembly 1 for flow therethrough or for actuating another motor in series with the downstream motor 11 herein.

I, therefore, particularly point out and distinctly claim as my invention:

1. A valve assembly comprising a housing having upstream and downstream bores each intersected axially therealong by a bypass passage having upstream and downstream end portions for connection with a fluid pressure source and a tank respectively and a middle portion extending between and intersecting both bores, by a pressure feed passage leading to said upstream end portion and to said middle portion respectively, by a motor passage for connection with a fluid motor, and by a return passage for connection with said downstream end portion; upstream and downstream valve spools in the respective bores each movable from a neutral position whereat said bypass passage is open to an operating position whereat said bypass passage is closed and said feed passage is communicated with said motor passage for actuation of said upstream motor or said downstream motor by fluid under pressure in said upstream end portion or in said middle portion; said upstream spool having another operating position closing said bypass passage and being hollow and having axially offset passages through the wall thereof which in said another operating position communicates the motor passage of said upstream bore with said middle portion for return flow from the upstream motor to said middle portion for flow to the downstream end portion when said downstream spool is in neutral position or for actuation of the downstream motor when said downstream spool is in said operating position; and a tubular member in said return passage of said upstream bore slidably receiving said upstreams spool for blocking flow of fluid through said upstream spool passages to said return passage when said upstream spool is in said operating position.

2. The valve assembly of claim 1 wherein said tubular member has a passage through the wall thereof axially beyond said upstream spool passages opening into said return passage whereby high pressure fluid which may leak between said upstream spool and said upstream bore and said tubular member is vented at said return passage to minimize leakage of fluid exteriorly of said housing.

3. The valve assembly of claim 2 wherein a packing ring between said upstream spool and said tubular member and axially beyond the passage of the latter is subjected only to the lower pressure of said return passage in preventing external leakage of fluid between said upstream spool and said tubular member.

4. A valve assembly comprising a housing having upstream and downstream bores each intersected starting at the middle by a bypass passage having upstream and downstream end portions for connection with a fluid pressure source and a tank respectively and a middle portion extending between and intersecting both bores, by a pair of pressure feed passages straddling said bypass passage and leading to said upstream end portion and to said middle portion respectively, by a pair of motor passages straddling said pressure feed passages for connection with a double acting fluid motor, and by a pair of return passages straddling said motor passages and leading to said downstream end portion; upstream and downstream valve spools in the respective bores each movable from a neutral position whereat said bypass passage is open, to operating positions whereat said bypass passage is closed and whereat either feed passage is communicated with the adjacent motor passage for pressure flow to the motor while communication between the other feed passages and adjacent motor passage is blocked; said upstream spool being hollow to provide two cavities each with axially offset passages through the wall thereof which in said operating positions communicates either motor passage with said middle portion for return flow from the motor to said downstream end portion when the downstream spool is in neutral position or for actuation of the downstream motor when said downstream spool is in either of said operating positions; and tubular members in the return passages of said upstream bore slidably receiving said upstream spool for blocking flow of fluid through said spool passages to said return passages when said upstream spool is in either of said operating positions.

5. The valve assembly of claim 4 wherein said downstream spool is similar to said upstream spool except to conduct return flow from either motor passage to said downstream end portion instead of to said middle portion; and wherein tubular members similar to those of the upstream bore are disposed in the return passages of said downstream bore for blocking flow of fluid through said downstream spool passages to said return passages when said downstream spool is in either of said operating positions.